Oct. 18, 1955  A. GISIGER  2,720,748
WATERTIGHT WATCH-CASE
Filed Feb. 26, 1953
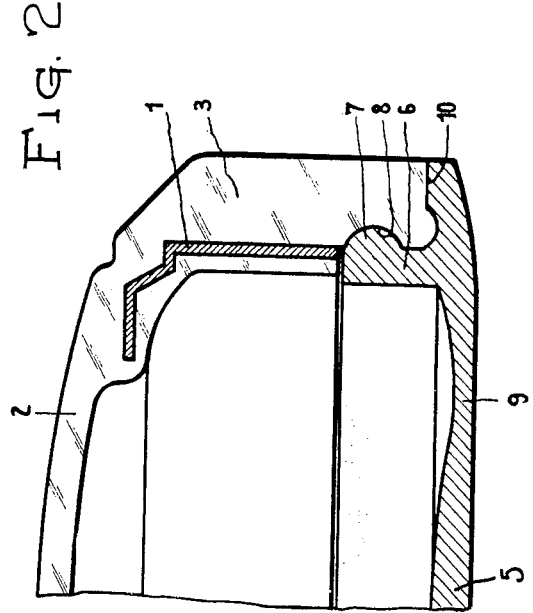
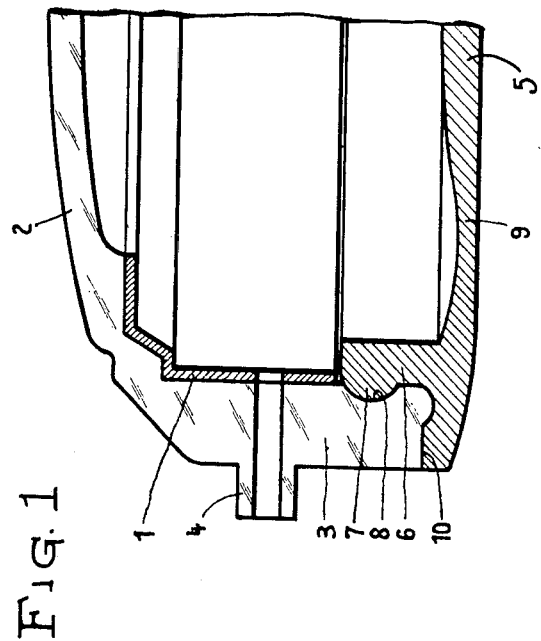
INVENTOR
Armin Gisiger
BY Edward F. Connors
ATTORNEY

United States Patent Office 2,720,748
Patented Oct. 18, 1955

2,720,748

WATERTIGHT WATCH-CASE

Armin Gisiger, Selzach, Switzerland

Application February 26, 1953, Serial No. 339,117

Claims priority, application Switzerland March 4, 1952

5 Claims. (Cl. 58—88)

The present invention relates to a watertight watch case comprising a thin metallic frame, a cup-shaped member formed of plastic material which is molded on the metallic frame during the manufacture of the watch case and constitutes a combined glass and center of the case, the metallic frame being permanently attached to the center, a detachable back and means securing the back in closing relationship with the said cup-shaped member.

The attached drawing represents, by way of example, two embodiments of the invention.

Fig. 1 is a diametral cross-sectional view of a portion of the first embodiment.

Fig. 2 is a similar view of the second embodiment.

In order to manufacture the watch-case shown in the drawing, a thin metallic frame 1 is formed, for instance by swaging or pressing. This frame 1 is then covered with a layer of transparent plastic material (synthetic resin of the Plexiglas type, unbreakable glass, etc.).

In the first embodiment this layer is applied only to the outer face of the metallic frame 1. It forms therefore on the one hand the glass 2 of the watch-case and, on the other hand, its centre 3. The tube 4 for the winding stem (not shown) is made integral with the centre 3. It might also, in a modified embodiment (not shown), be formed by a metallic sleeve fixed to the frame 1.

In the second embodiment (right-hand portion of the drawing) the transparent plastic material is applied to both faces of the frame 1, so that the latter is embedded in the plastic mass.

The plastic material is preferably applied by injection under pressure to the metallic frame 1.

The back 5 of the watch-case shown in the drawing is for instance made of metal. It is formed with a projecting rib 6 having an outer bead 7 engaging with a snap action in a groove 8 of a corresponding shape made in the centre 3, thus guaranteeing the tightness of the watch-case. The back 5 has a thinned zone 9 in order to facilitate the elastic engagement of the bead 7 into the groove 8. For separating the back 5 from the remainder of the watch-case, it is sufficient to introduce the blade of a knife into the joint 10 between the centre 3 and the back 5.

What I claim is:

1. A watch case comprising an integral face and center formed of plastic material, a thin metallic frame for the center, an annular extension for the frame projecting into the edge of the face, the center having an annular groove adjacent its outer end, the frame extending to the inner edge of the groove, a detachable back, an inwardly projecting annular rib positioned adjacent the edge of the back, and an annular bead extending outwardly on the rib and adapted to engage in the groove in the center, the back having an annular thinned zone positioned inwardly of the bead whereby the elastic engagement of the bead into the groove is facilitated as the back is placed in closing relationship with the integral face and center member.

2. A watch case comprising an integral face and center formed of plastic material, a thin metallic frame for the center positioned on the inner surface of the plastic face and center member, an annular extension for the frame projecting into the edge of the face, the center having an annular groove adjacent its outer end, the frame extending to the inner edge of the groove, a detachable back, an inwardly projecting annular rib positioned adjacent the edge of the back, and an annular bead extending outwardly on the rib and adapted to engage in the groove in the center, the back having an annular thinned zone positioned inwardly of the bead whereby the elastic engagement of the bead into the groove is facilitated as the back is placed in closing relationship with the integral face and center member.

3. A watch case comprising an integral face and center formed of plastic material, a thin metallic frame for the center embedded in the wall of the plastic face and center member, an annular extension for the frame projecting into the edge of the face, the center having an annular groove adjacent its outer end, the frame extending to the inner edge of the groove, a detachable back, an inwardly projecting annular rib positioned adjacent the edge of the back, and an annular bead extending outwardly on the rib and adapted to engage in the groove in the center, the back having an annular thinned zone positioned inwardly of the bead whereby the elastic engagement of the bead into the groove is facilitated as the back is placed in closing relationship with the integral face and center member.

4. A watch case comprising an integral face and center formed of plastic material, a thin metallic frame for the center, an annular extension for the frame projecting into the edge of the face, the center having an annular groove adjacent its outer end, the frame extending to the inner edge of the groove, a detachable back, an inwardly projecting annular rib positioned adjacent the edge of the back, and an annular bead extending outwardly on the rib and adapted to engage in the groove in the center.

5. A watch case comprising a thin metallic frame, a cup-shaped member formed of plastic material which is molded on the metallic frame during the manufacture of the watch-case and constitutes a combined glass and center of the case, the metallic frame being permanently attached to the center, a detachable back and means securing the back in closing relationship with the cup-shaped member.

References Cited in the file of this patent

UNITED STATES PATENTS

| | | |
|---|---|---|
| 2,131,319 | Greenholtz et al. | Sept. 27, 1938 |
| 2,155,842 | Ruger | Apr. 25, 1939 |
| 2,187,863 | Morf | Jan. 23, 1940 |
| 2,241,180 | Burke | May 6, 1941 |
| 2,380,215 | Caldara | July 10, 1945 |
| 2,465,799 | Gravesen | Mar. 29, 1949 |
| 2,621,468 | Colomb | Dec. 16, 1952 |

FOREIGN PATENTS

| | | |
|---|---|---|
| 253,750 | Switzerland | Nov. 16, 1948 |
| 660,365 | Great Britain | Nov. 7, 1951 |